United States Patent [19]

Kawada

[11] Patent Number: 4,854,421

[45] Date of Patent: Aug. 8, 1989

[54] SYSTEM FOR LIFTING A VEHICLE FOR REPAIR THEREOF

[75] Inventor: Hiroyuki Kawada, Hekinan, Japan

[73] Assignee: Sugiyasu Industries Co., Ltd., Japan

[21] Appl. No.: 153,730

[22] Filed: Feb. 9, 1988

[30] Foreign Application Priority Data

Feb. 10, 1987 [JP] Japan .................................. 62-18152

[51] Int. Cl.[4] .............................................. B60S 13/00

[52] U.S. Cl. ..................................... 187/8.71; 187/18; 182/141; 254/89 H

[58] Field of Search ..................... 187/8.61, 6.71, 8.72, 187/18, 8.43, 8.41; 182/141, 63; 254/89 H, 89 R, 122

[56] References Cited

U.S. PATENT DOCUMENTS

| | | | |
|---|---|---|---|
| 3,341,042 | 9/1967 | Carder | 254/89 H |
| 3,447,635 | 6/1969 | Carlbem | 182/141 |
| 4,573,663 | 3/1986 | Nussbaum | 254/89 H |
| 4,577,821 | 3/1986 | Edmo et al. | 187/18 |
| 4,724,930 | 2/1988 | Van Lierop | 254/89 H |

FOREIGN PATENT DOCUMENTS

| | | | |
|---|---|---|---|
| 883107 | 10/1971 | Canada | 187/18 |
| 1195028 | 6/1965 | Fed. Rep. of Germany | 187/8.43 |
| 690682 | 2/1930 | France | 187/8.71 |
| 6324192 | 2/1988 | Japan . | |

*Primary Examiner*—Joseph J. Rolla
*Assistant Examiner*—Kenneth Noland
*Attorney, Agent, or Firm*—Lahive & Cockfield

[57] ABSTRACT

A system for lifting a vehicle for repair thereof has a pair of parallel pits whihc are made in a floor and connected to each other by a passage. A rotatable support rod extends through the entire length of said passage and projects into both of the pits. A pair of scissors jacks are supported in the respective pits. Each scissors jack includes a pair of parallel vertically-extensible double-scissors constructions. The double-scissors constructions can be retracted or folded into the associated pit. Each double-scissors construction comprises a pair of upper and lower vertically-extensible X-shaped elements pivotally connected to each other. Each X-shaped element includes a pair of links pivotally connected to each other in the alphabetical letter "X". One of the links of the lower X-shaped element has a lower end fixed to the support rod, so that all the four double-scissors constructions of the two scissors jacks are connected to the common support rod. The other link of the lower X-shaped element has a lower end slidably supported in the pit. A vehicle support is supported on the upper X-shaped elements of the double-scissors constructions. One of the links of each upper X-shaped element has an upper end pivotally connected to the vehicle support, and the other link thereof has an upper end slidably connected to the vehicle support.

3 Claims, 2 Drawing Sheets

SYSTEM FOR LIFTING A VEHICLE FOR REPAIR THEREOF

FIELD OF THE INVENTION

This invention relates to a system for lifting a vehicle for repair thereof which includes a pair of scissors jacks and more particularly to such a system wherein each scissors jack comprises a pair of double-scissors constructions.

BACKGROUND OF THE INVENTION

One of the prior types of systems for lifting vehicles for repair is a system in which the synchronous movement of vehicle supports of a pair of jacks is effected by conduits connecting together, in series, hydraulic cylinders provided for the respective jacks and a source of hydraulic fluid to actuate the cylinders.

In the manufacture of the foregoing system of the prior art, the work of connecting together the cylindres and the fluid source in series takes much time and trouble and requires a highly-developed piping technique. Also, if air is contained in the conduits or the cylinders or if the fluid leaks therefrom, the exact synchronous movement of the jacks and, hence, of their vehicle supports may be lost. In such a case, a vehicle on the supports may have a tilt and fall down. Therefore, such a situation may constitute a grave danger. Thus the foregoing prior system may require a vigorous inspection thereof at frequent intervals.

SUMMARY OF THE INVENTION

An object of the invention is to provide a system for lifting a vehicle for repair thereof which includes a pair of scissors jacks each comprising a pair of double-scissors constructions which are adapted for synchronous extension or retraction.

Another object of the invention is to provide a system for lifting a vehicle for repair thereof wherein the double-scissors constructions can be folded into a pit.

Still another object of the invention is to provide a system of the above-mentioned character which has a single means connecting together the double-scissors constructions of the two jacks to ensure the synchronous movement of the constructions. Such a system is more simple in construction than a conventional system in which the synchronous movement of vehicle supports of jacks is effected by conduits connecting together, in series, hydraulic cylinders provided for the respective jacks and a source of hydraulic fluid to actuate the cylinders. Also, such a system is more safe in operation than the above-mentioned conventional system because, even if the pressure in a hydraulic cylinder of one of the jacks is reduced when the double-scissors constructions are being extended, the foregoing single means ensures the synchronous movement of the double-scissors constructions to prevent a vehicle thereon from having a tilt.

According to the invention, a system for lifting a vehicle for repair thereof has a pair of parallel pits which are made in a floor and connected to each other by a passage. A rotatable support rod extends through the entire length of said passage and projects into both of the pits. A pair of scissors jacks are supported in the respective pits. Each scissors jack includes a pair of parallel vertically-extensible double-scissors constructions. The double-scissors constructions can be retracted or folded into the associated pit. Each doublescissors construction comprises a pair of upper and lower vertically-extensible X-shaped elements pivotally connected to each other. Each X-shaped element includes a pair of links pivotally connected to each other in the alphabetical letter "X". One of the links of the lower X-shaped element has a lower end fixed to the support rod, so that all the four double-scissors constructions of the two scissors jacks are connected to the common support rod. The other link of the lower X-shaped element has a lower end slidably supported in the pit. A vehicle support is supported on the upper X-shaped elements of the double-scissors constructions. One of the links of each upper X-shaped element has an upper end pivotally connected to the vehicle support, and the other link thereof has an upper end slidably connected to the vehicle support. A hydraulic cylinder with a piston rod is provided between the double-scissors constructions. The cylinder has a lower end connected to the support rod, and its piston rod has an upper end connected to the upper X-shaped elements of the double-scissors constructions by a connecting rod. When the system is not in use, the whole of the double-scissors constructions and the cylinder of each scissors jack is substantially in the associated pit. When the cylinder of either scissors jack is supplied with a hydraulic fluid, the piston rod of the cylinder extends to extend the associated double-scissors constructions. Simultaneously the double-scissors constructions rotate the support rod to extend the double-scissors constructions of the other scissors jack. Thus, all the four double-scissors constructions of the two scissors jacks are allowed to extend simultaneously.

Other objects and features of the invention will become apparent during the following discussion of the accompanying drawing.

DETAILED DESCRIPTION OF THE PREFERRED EMBODIMENT

Figure 1:
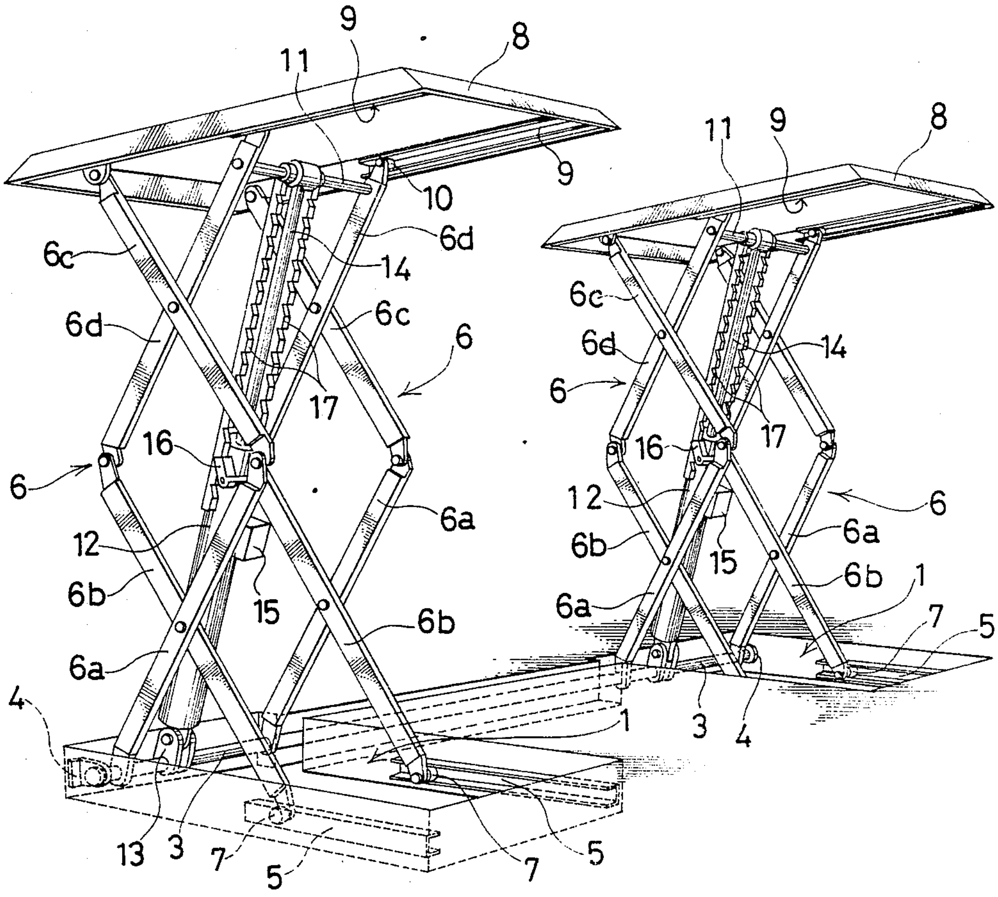
FIG. 1 is a perspective view of a system for lifting a vehicle for repair thereof according to the invention.

A system for lifting a vehicle for repair according to one preferred embodiment of the invention will now be described with reference to the drawing.

Figure 2:
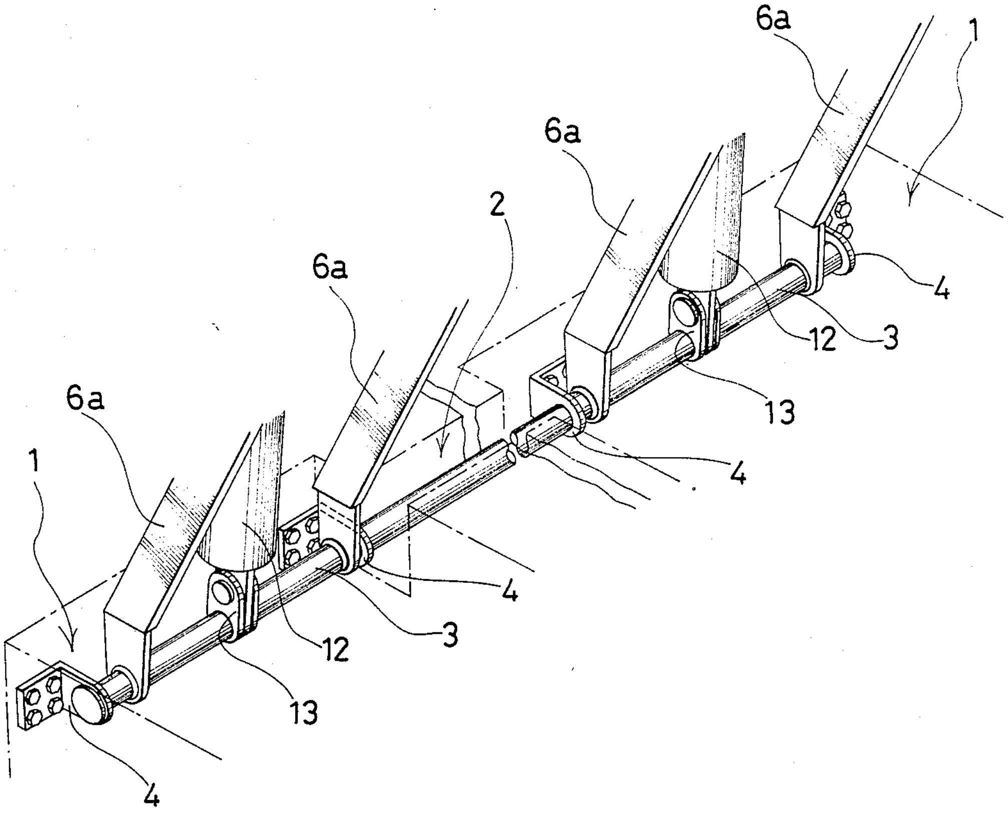
FIG. 2 shows first links of the system of FIG. 1 which are connected to a common rod.

Referring to FIGS. 1 and 2, the system of the invention includes a pair of parallel scissors jacks with lower ends supported in a pair of parallel rectangular pits 1, respectively, which are made in a floor and each have opposed long sides and opposed short sides. The pits 1 are connected to each other by a passage 2 which extend from a portion of an inner long side of one of the pits which is in close proximity to a corner of the pit, to the portion of an opposed inner long side of the other pit which is right opposite to that portion of the inner long side of the foregoing one of the pits. The passage 2 is not only opened into both pits, but also exposed to the space on the floor. A straight continuous rod 3 extends along one of the short sides of one of the pits, passes through the passage 2 and extends along one of the short sides of the other pit. The rod 3 terminates, at one end thereof, in close proximity to the portion of an outer long side of one of the pits which is opposite to one end of the passage 2. The rod 3 also terminates, at the other end thereof, in close proximity to the portion of an outer long side of the other pit which is opposite to the other end of the passage 2. In one of the pits the rod 3 is supported, by two bearings 4, at one end thereof and at a portion thereof which is in close proximity to one end of the passage 2, respectively. In the other pit the rod 3 is supported, also by two bearings 4, at the other end thereof and at a portion thereof which is in close proximity to the other end of the passage 3, respectively. The rod 3 is rotatably supported by the four bearings 4. In each pit, a pair of generally U-shaped guide members 5 are connected to the opposed long sides of the pit, respectively, and extend from approximate middles of the respective long sides of the pit to the short side thereof opposed to the short side thereof along which the rod 3 extends. Each guide member 5 is opened to the side of the other member 5.

The scissors jacks, supported in the respective pits at their lower ends, have exactly the same constructions and functions. Therefore only one of the jacks will now be described. The jack includes a pair of parallel vertically-extensible double-scissors constructions 6 which are opposed to each other and adapted for synchronous extending or retracting movement. Each construction 6 comprises a pair of upper and lower vertically-extensible scissors-shaped elements. The lower scissors-shaped element includes a first link **6*a* and a second link 6*b* which are pivotally connected to each other, at their middle portions, in the shape of the alphabetical letter "X". The upper scissors-shaped element includes a third link 6*c* pivotally connected, at its lower end, to the upper end of the first link 6*a* and a fourth link 6*d* pivotally connected, at its lower end, to the upper end of the second link 6*b*. As in the case of the first and second links 6*a* and 6*b*, the third and fourth links 6*c* and 6*d* are pivotally connected to each other, at their middle portions, in the shape of the letter "X". The first link 6*a* of one of the opposed constructions 6 has a lower end welded to a portion of the rod 3 which is inward of the bearing 4 nearer to one of the long sides of the pit and is in close proximity to that bearing. The first link 6*a* of the other construction has a lower end welded to a portion of the rod 3 which is inward of the bearing 4 near to the other long side of the pit and is in close proximity to that bearing. Each second link 6*b* of each construction 6 is provided, at its lower end, with a roller 7 which is fitted into one of the guide members 5. The lower end of the second link is pivotally connected to the roller 7. The roller 7 is adapted to roll over the length of the guide member 5. Thus each second link 6*b* is slidable along the associated guide member 5. When the second links 6*b* slide, the opposed constructions 6** are extended or retracted.

A vehicle support 8 is supported on the tops of the opposed double-scissors constructions 6. The support 8 has a horizontal rectangular flat top and four inclined trapezoidal sides. The third links **6*c* of the two constructions 6 are pivotally connected, at their tops, to portions of the insides of opposed long sides of the support 8 which are in proximity to one of opposed short sides of the support 8, respectively. A generally U-shaped guide member 9 is connected to the inside of each long side of the support 8, and extends from an approximate middle of the long side of the support 8 to the inside of the short side of the support 8 which is further from the tops of the third links 6*c*. Each fourth link 6*d* is provided with a roller 10 at its top. Each roller 10 is fitted into one of the guide members 9. The fourth link 6*d* is pivotally connected to the roller 10. Each roller 10 is adapted to roll over the length of the associated guide member 9. Thus each fourth link 6*d*** is slidable along the associated guide member.

Portions of the fourth links **6*d* slightly below their tops are connected to each other by a horizontal rod 11. Thus the opposed double-scissors constructions 6 are connected to each other by the rod 11**.

A hydraulic cylinder 12 is provided between the opposed constructions 6. The cylinder 12 is parallel to the opposed constructions 6. The cylinder 12 has a lower end pivotally connected to a pair of links 13 which are fixedly mounted on an approximate middle of the portion of the rod 3 in the pit. Also, the cylinder 12 has a piston rod 14 with a cylindrical upper end which is rotatably provided around the middle portion of the rod 11.

A pair of racks 17 are provided on opposed sides of the cylinder 12, and extend along the cylinder 12. Each rack 17 has a plurality of recesses. The racks 17 have upper cylindrical ends which are rotatably provided around the round 11 and located on opposed sides of the upper cylindrical end of the piston rod 14. The racks have lower free ends. A pair of clicks 16 are pivotally connected to opposed sides of the upper portion of the cylinder 12. The clicks 16 are so located and shaped as to engage the recesses of the associated racks 17. Both clicks 16 are operatively connected to a solenoid 15 which is secured to the cylinder 12 and is located in a lower position than the clicks 16. Since the racks 17 are connected to the same rod 11 as the piston rod 14, the racks are movable together with the piston rod. When the piston rod 14 is extended, the racks are extended while making contact with the clicks 16, and when the rod 14 has been extended tpo the desired height, each click is in engagement of one of the recesses of the rack. Thus, if the hydraulic pressure in the cylinder is reduced when the vehicle support 8 is in its lifted position, there is no possibility that the support 8 may be lowered from its lifted position.

When the lift system is not in use, the whole of the double-scissors constructions 6 and the cylinder 12 with its piston rod is substantially in the pit and the vehicle support 8 completely covers the pit with the lower ends of the four inclined sides of the support 8 resting on the floor at a slight distance from the four sides of the pit. When the cylinder 12 is supplied with a hydraulic fluid, its piston rod 14 is extended upwardly to extend upwardly the double-scissors constructions 6 upwardly (FIG. 1). Simultaneously when thus extended, the double-scissors constructions 6 rotate the support rod, by their first links **6*a* connected thereto, to extend the double-scissors constructions 6 of the other scissors jack. Thus, all the four double-scissors constructions of the two scissors jacks are allowed to extend simultaneously. And, thus, the vehicle supports 8 of the two scissors jacks are allowed to keep the same level at all times when the supports 8 are not in motion. When the supports 8 are to be lowered, not only the cylinders 12 are released from the hydraulic pressure, but also the solenoids 15 are operated to disengage the clicks 16 from the racks 17, thereby allowing the scissors constructions 6 and the cylindres 12 to retract into the pit to lower the supports 8 onto the floor. In this connection, it will be appreciated that the retraction of the scissors constructions 6 into the pit means that the constructions 6** are folded into the pit.

In the illustrated embodiment, the first links 6a are welded to the rod 3. However, if desired, the links 6a and the rod 3 may be modified in such a manner that the links 6a fits into recess in the rod 3 and is fixed to the rod 3 by a pin or the like. Also, if desired, the link 13 for pivotally supporting the cylinder 12 may be connected not to the rod 13, but to the wall of the pit. Furthermore, if required, the passage 2 may be formed in the floor in such a manner that the former is covered with the surface of the latter.

Even if the hydraulic pressure in the cylinder of one of the two scissors jacks is reduced when the jacks are being extended, the rod 3 ensures the synchronous movement of the jacks to prevent a vehicle thereon from having a tilt. In such a case, therefore, safety is ensured for repair work of the vehicle.

The system of the invention is more simple in construction and more cheap to manufacture than a conventional system in which the synchronous movement of hydraulic fluid to actuate the cylinders. Also, since the synchronous movement of the cylinders of the present system is ensured by the rod 3, the necessity of bleeding air and of checking air leakage and making a repair work therefor is less urgent for the present system than for the foregoing conventional system.

The system of the invention may be modified, without reducing the extended height of the entire system, by constructing from a single X-shaped element each of a pair of opposed extensible constructions for each scissors jack. Such a modification may be made by using, for each X-shaped element, a pair of links of such greater lengths that the links extend to the same height as the whole of the illustrated doublescissors construction and by making pits of such greater lengths that the whole of each such X-shaped element is folded, or stored, into the pits.

What is claimed is:

1. A system for lifting a vehicle for repair thereof, comprising (A) a pair of parallel pits made in a floor; (B) a passage within the floor extending perpendicular to the pits and connecting the pits with each other; (C) a pair of spaced-apart parallel scissor jacks, each jack being supported in one of the pits and including (i) a pair of spaced-apart, parallel, vertically-extensible scissor constructions which ae supported within one of the pits and are retractable or foldable into their respective pit, (ii) a vehicle support means supported on said scissor constructions, and (iii) an actuating means for extending or retracting said scissor constructions, each said scissor constructions having (a) first and second lower ends located in the pit and (b) first and second upper ends which support said vehicle support means; (D) an elongate member for connecting together the first lower ends of the scissor constructions of both of said scissor jacks, said elongate member extending through the entire length of the passage and projecting into both of said pits, each portion of the elongate member extending into the pits being fixed to the first lower ends of said scissor constructions of each said scissor jack; (E) each said scissor jack further including (iv) means for slideably supporting the second lower ends of said scissor constructions, (v) means for pivotally connecting the first upper ends of said scissor constructions to said vehicle support means, (vi) means for slideably supporting the second upper ends of said scissor construction against said vehicle support means, (vii) means for pivotally connecting a lower end of said actuating means to the portion of said elongate member which projects into the pit, and (viii) means for connecting an upper end of said actuating means to upper portions of said scissor constructions; and (F) means for supporting the elongate member in such a manner that said elongate member rotates about a central axis thereof at the same time when the scissor constructions of one of said scissor jacks are extended or retracted, thereby extending or retracting the scissor constructions of the other scissors jacks simultaneously with the scissor constructions of said one of said scissor jacks.

2. A system in accordance with claim 1 wherein (A) each said scissor construction comprises a single X-shaped element including a first link and a second link pivotally connected to each other in the shape of the letter "X";

(B) said first lower end of the scissor construction is a lower end of said first link;

(C) said second lower end of the scissor construction is a lower end of said second link;

(D) said first upper end of the scissor construction is an upper end of said second link; and (E) said second upper end of the scissor construction is an upper end of said first link.

3. A system in accordance with claim 1 wherein (A) each said scissor construction comprises a pair of upper and lower X-shaped elements;

(B) said lower X-shaped element includes a first link and a second link pivotally connected to each other in the shape of the letter "X";

(C) said upper X-shaped element includes a third link and a fourth link pivotally connected to each other in the shape of the letter "X";

(D) said first link of the lower X-shaped element is pivotally connected, at an upper end thereof, to a lower end of said third link of the upper X-shaped element;

(E) said second link of the lower X-shaped element is pivotally connected, at an upper and thereof, to a lower end of said fourth link of the upper X-shaped element;

(F) said first lower end of the scissor construction is a lower end of said first link;

(G) said second lower end of the scissor construction is a lower end of said second link;

(H) said first upper end of the scissor construction is an upper end of said third link; and (I) said second upper end of the scissor construction is an upper end of said fourth link.

* * * * *

UNITED STATES PATENT AND TRADEMARK OFFICE

CERTIFICATE OF CORRECTION

PATENT NO. : 4,854,421

DATED : August 8, 1989

INVENTOR(S) : Hiroyuki Kawada

It is certified that error appears in the above-identified patent and that said Letters Patent is hereby corrected as shown below:

Column 4, line 36,replace "tpo" with --to--.

Column 5, line 45, replace "ae" with --are--.

In the Abstract, line 3, replace "whihc" with --which--.

Signed and Sealed this

Twenty-sixth Day of March, 1991

*Attest:*

HARRY F. MANBECK, JR.

*Attesting Officer*

*Commissioner of Patents and Trademarks*